United States Patent
Wuebbels et al.

(10) Patent No.: US 6,527,206 B1
(45) Date of Patent: Mar. 4, 2003

(54) METHOD FOR PROCESSING MIXED WASTE, PROCESSING PLANT AND BUFFER SILOS THEREFOR

(75) Inventors: Alfons Wuebbels, Gescher (DE); Josef Koetting, Gescher (DE)

(73) Assignee: "der Gruene Punkt", Duales System Deutschland AG, Cologne (DE)

( * ) Notice: Subject to any disclaimer, the term of this patent is extended or adjusted under 35 U.S.C. 154(b) by 0 days.

(21) Appl. No.: 09/582,202

(22) PCT Filed: Dec. 22, 1998

(86) PCT No.: PCT/DE98/03802
§ 371 (c)(1),
(2), (4) Date: Oct. 2, 2000

(87) PCT Pub. No.: WO99/36180
PCT Pub. Date: Jul. 22, 1999

(30) Foreign Application Priority Data

Jan. 15, 1998 (DE) .......................................... 198 01 286

(51) Int. Cl.⁷ ............................................... B02C 23/14
(52) U.S. Cl. .................. 241/19; 241/24.14; 241/24.18; 241/24.19; 241/29; 241/79.1; 241/152.2
(58) Field of Search .................... 241/DIG. 38, 79.1, 241/3, 24.13, 24.14, 24.15, 24.18, 24.19, 29, 152.1, 152.2

(56) References Cited

U.S. PATENT DOCUMENTS 3,602,380 A   8/1971  Spencer
5,464,100 A * 11/1995  Oka ........................... 209/137

FOREIGN PATENT DOCUMENTS

| FR | 1 089 059 | 3/1955 |
| GB | 1 498 108 | 1/1978 |
| WO | 96 20819  | 7/1996 |

* cited by examiner

*Primary Examiner*—Mark Rosenbaum
(74) *Attorney, Agent, or Firm*—Oblon, Spivak, McClelland, Maier & Neustadt, P.C.

(57) ABSTRACT

A method for processing mixed waste in a continuously operating processing plant comprising a plurality of successive stations which are connected to each other by means of at least one conveyor segment and wherein the mixed waste material is processed in at least one step of the inventive method and/or conveyed along at least one conveyor section, whereby the particles in the stream of mixed waste are accelerated at least in one transfer site between a conveyor section or one transfer site between two conveyor sections. Also disclosed is a processing plant for implementing said method and buffer silos which are used in the plant.

17 Claims, 8 Drawing Sheets

10) COMPACTING        11) COMMINUTING

METHOD FOR PROCESSING MIXED WASTE, PROCESSING PLANT AND BUFFER SILOS THEREFOR

BACKGROUND OF THE INVENTION

1. Field of the Invention

The invention relates to a process for processing mixed waste, in particular mixed waste consisting mainly of plastics, paper-plastics-composite materials, glass, metals, paper, cardboard, and other waste substances. Furthermore, the invention relates to a processin plant for performing the process.

2. Discussion of the Background

When the dual system was introduced with regard to implementing the packaging regulations in Germany, a special challenge proved to be the proper recycling of the collected plastic materials. In doing so, a completely new fraction, namely the mixed plastic materials, came onto the market. For the mixed plastics, because of their heterogeneity and fluctuating composition, special recycling methods must be found. For the recycling of mixed plastic materials, mainly a raw material recycling can be considered. A pre-requisite for this is a processing of the material into an agglomerate which meets predetermined specifications. Since the plastic materials are collected together with a number of other waste materials within the framework of the Dual System, processes are required which reduce the sorting work to an acceptable limit, but nevertheless ensure a certain degree of purity of the plastic material.

Metallic waste matter can be separated by means of magnetic separators and eddy current separators. Heavy plastic materials and other heavy foreign components are usually separated from the material to be processed by means of air sifting. Furthermore, various processes are known for removing paper particularly from paper-plastic composite materials.

With the improved separation of waste materials, nowadays dry processes can be used for processing mixed plastic materials with which a good quality plastic material agglomerate can be produced at a comparatively low energy consumption. In this connection the process disclosed in the WO 96/20819 is being widely used, with which the material to be processed is first comminuted and freed from magnetic substances. The comminuted material is then compacted in an agglomerator by pressing or it is thermally agglomerated, whereby volatile substances, such as, for example, water vapour, ash and paper, are drawn off by a suction device. Then the agglomerated material is dried and subsequently screened.

For economical reasons it is desirable to ensure a continuous operation of the plant. This is not possible with the process known from the WO 96/20819. The breakdown of one plant component usually results in the shut-down of the entire plant and leads to outage times caused by repair and maintenance work. A further disadvantage lies in the fact that the paper is not removed from the waste stream in notable quantities. It is apparent from the above said that paper is only removed as a volatile material using the process according to WO 96/20819, so that, for example, plastic-paper composite materials can only be partially digested or not at all. Thus, the agglomeratiel contains a considerable amount of paper.

U.S. Pat. No. 5,464,100 describes a sorting device for solid waste consisting of a storage station having a discharge section, several conveying sections being arranged one after the other, a sorting device, and a wind sifter. Therein, a second set of conveying belts is arranged immediately behind a first set of conveying belts, wherein the conveying speed is increased on the second set of conveying belts with respect to the first set. This is used to limit the stack depth of the waste on the second set of conveying belts during a subsequent manual sorting.

SUMMARY OF THE INVENTION

It is the object of the present invention to provide a process for processing mixed waste, which mainly consists of plastic materials, cardboard, paper, paper/plastic composite materials, glass, metals, and other waste substances, for providing plastic material being substantially free of foreign materials to an agglomerator.

The above-described object of the present invention is achieved by a process as described in the following paragraphs.

A process according to the invention for processing mixed waste for the operation of a continuously operating dry-mechanical processing plant, which comprises a plurality of successive processing stations each connected by at least one conveying section, with at least the steps in the sequence metal separation, air sifting and paper removal, between which further steps may be provided or which follow one another directly, is characterized in that the good-material flow, during the transfer to the last conveying section before the processing station experiences an acceleration therefrom, so that the average actual speed of the particles of the good-material flow on the last conveying section immediately before entering the processing station of the metal separation is slower than immediately before it enters the processing station of the wind sifter and this in turn is slower than the average speed immediately before it enters the processing station of the paper separation.

In this regard, the good-material flow is the material flow of qualitatively high-grade material, i.e. of the material which must still be further processed in the further course of the process, and the actual speed of the particles is the actual path travelled by the particles per time.

Preferably, the mixed waste flow between two adjoining stations is conveyed on the respective conveying section at a substantially constant speed.

It may furthermore be provided that in at least one of the stations a stock of possibly pre-treated material is temporarily stored.

An embodiment of the process according to the invention is characterized by the following steps:

(a) Comminuting of the mixed waste;
(b) Intermediate storage of the comminuted mixed waste;
(c) Uniform conveying of the intermediately stored mixed waste;
(d) Separating of magnetic metal particles;
(e) Separating of non-magnetic particles of materials with a specific weight which exceeds a predetermined minimum specific weight;
(f) Separating of paper, for example from the paper/plastic composite materials;
(g) Intermediate storage of the obtained plastic material fraction; and
(h) Agglomerating of the plastic material fraction.

The term agglomerating herein means the compacting into a bulk material by supplying heat and/or friction energy to the material to be agglomerated.

Optionally further process steps may be added, for example after the intermediate storage of the obtained plastic material fraction another separating of non-magnetic particles may take place. Furthermore it may be advantageous to comminute the agglomerated plastic material to a fixed particle size. Sometimes it may be expedient to subsequently carry out another separation of magnetic metal particles that only become accessible to a magnetic separation after the comminuting process.

According to another embodiment the process according to the invention is carried out in such a way that the material to be processes is conveyed only pneumatically on certain conveying sections.

The invention is based on the finding that an effective separation of the paper is only successful if the flow of the waste material to be treated is accelerated, i.e. practically a "widening up" of the material takes place. This facilitates the separation of waste substances in the various waste separators.

A continuous process can easily be carried out when it is ensured that at a critical points of the processing process an intermediate storage of the material processed up to then takes place. As already mentioned at the outset, waste comminutors or shredders are such critical components. For this reason a processing plant usually comprises several such shredders, all of which operate into a buffer silo. Thus, the breakdown of one shredder does not result in a shutdown of the plant since the material from the buffer silo can still be fed to the following plant components. In this connection it is also possible to utilize the known advantage of a buffer silo in that it has a homogenizing effect on the pre-comminuted material and the same can then be passed on to the following plant components in a uniform composition. Shredders or waste comminutors pulsate very heavily during operation, which makes a uniform feeding of the following waste material separators difficult. The buffer silo, therefore, also acts as a mechanical decoupling from plant components.

Following the buffer silo, at least one magnetic separator may be provided, furthermore at least one device for separating non-magnetic particles from materials with a specific weight which exceeds a predetermined minimum specific weight. It has proved advantageous to use so-called gravity pipe sifters. With such gravity pipe sifters metallic and non-metallic heavy particles are filtered off, so that an eddy current separator can be usually dispensed. The plant furthermore comprises at least one device for separating paper, for example from the paper/plastic composite materials, which is/are followed by a buffer silo in which the plastic material fraction from each device for the separating of paper is collected. In this way it becomes possible to use a continuously operating disc compactor which can be obtained, for example, as CV 50 from the company Netztsch Condux, Hanau.

The homogenizing and evening-out effect of the buffer silos in which the plastic material fraction is collected can be utilized to connect a further device for separating heavy non-magnetic particles.

A buffer silo for a processing plant, being provided following the shredder or shredders, consists of a housing with at least one opening in the upper part of the housing for feeding in the material for the intermediate storage and at least one discharge opening for the material and is characterized in that in the bottom part of the housing a plurality of discharge screws are provided, wherein the discharge screws are arranged in such a way that their action covers the entire bottom area of the housing and at least one fore-runner screw is provided which homogenizes the material discharge from the discharge screws. This prevents that larger quantities of material rush into the chambers of the scraper chain conveyor.

Here the discharge screw may each operate with a different direction of rotation, e.g. they may optionally operate turning to the left or to the right.

Advantageously the discharge screw are arranged parallel to one another and the fore-runner screw is arranged offset by 90° relative to the discharge screws. The fore-runner screw may also optionally operate turning to the left or right.

A buffer silo for a processing plant in which the plastic material fraction is collected, consists of a housing with at least one opening in the upper part of the housing for feeding in the material for the intermediate storage and at least one discharge opening for the material and is characterized in that at least one loosening-up screw placed under pressure is provided for the material stored in the buffer silo and that a suction device supplies air from the housing to the at least one loosening-up screw. Furthermore, special discharge screws are provided in the buffer silo, which convey the intermediately stored material to the at least one loosening-up screw.

It has proved expedient to widen the housing conically or in a trapezoidal shape towards the bottom—depending on the basic shape of the housing—to avoid a bridge formation in the silo.

BRIEF DESCRIPTION OF THE DRAWINGS

In following the invention will be explained in greater detail with reference to the attached drawing, wherein FIG. 1 with partial figures A, B, C, D, and E illustrates diagrammatically the process flow-sheet for a processing process that uses the invention;

FIG. 6 is a longitudinal sectional view of an agglomerator of the

DESCRIPTION OF THE PREFERRED EMBODIMENTS

In the FIGS. 1A to E the processing process for producing a plastic agglomerate with the stations 1.) to 18.) is illustrated diagrammatically. Arrows indicate the path of the mass flow. The arrows denoted with the numeral "1" indicate the path of the conveying air, the arrows with the numeral "2" the mass flow of paper. Arrows with the numeral "3" denote the mass flow for magnetic metals, arrows with the numeral "4" the mass flow for non-magnetic waste substances which comprise mainly glass, aluminum-coated plastic material, moist and wet lumps of paper, stones, wood, disposable packaging with a plastics content of less than 50% and non-magnetic metals. Finally, arrows with the numeral "5" denote the flow which leads to the desired mixed plastic material, which is further processed into an agglomerate, with a decreasing content of waste substances or other utilizable substances that are filtered out in the individual stations.

Figure 1A:
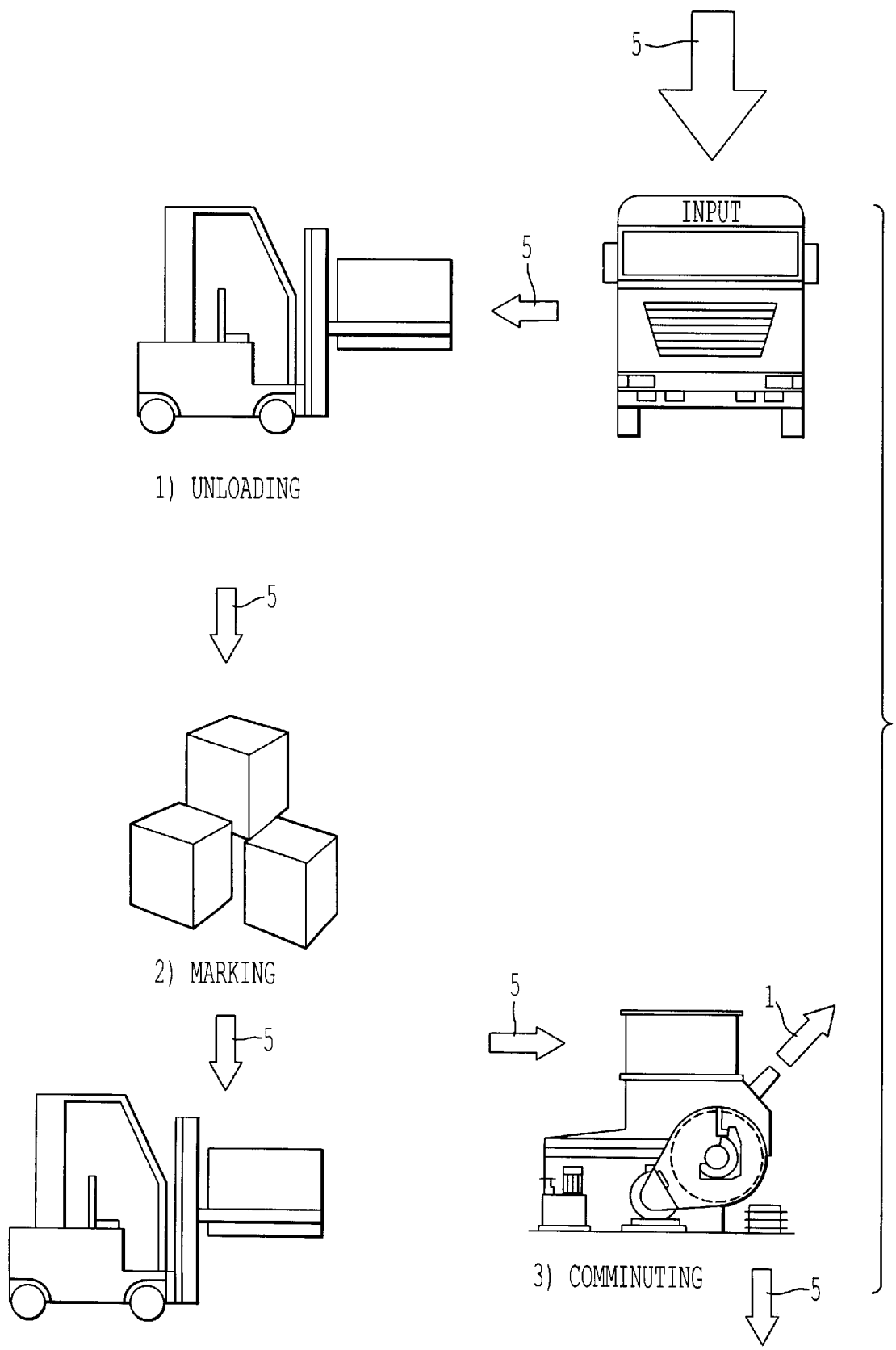

The contaminated mixed plastic material, as indicated in FIG. 1A, is delivered and unloaded (station 1.)) as well as marked (station 2.)) so that waste substances which could cause a contamination of the agglomerate or damage to the components of the plant can be clearly allocated. The supplied material is first comminuted in a known waste comminutor or shredder to a specific particle size (station 3.)).

A holding-down device presses the plastic balls fed into the shredder onto the rotor with a specific contact pressure. The fraction is shredded by the rotor for so long until the material fed into it falls through a screen provided at the bottom of the mill, which has an opening diameter of, for example, 45 mm. By using different screen sizes the diameter of the comminuted material can be adapted to the requirements of the plant.

Figure 1B:
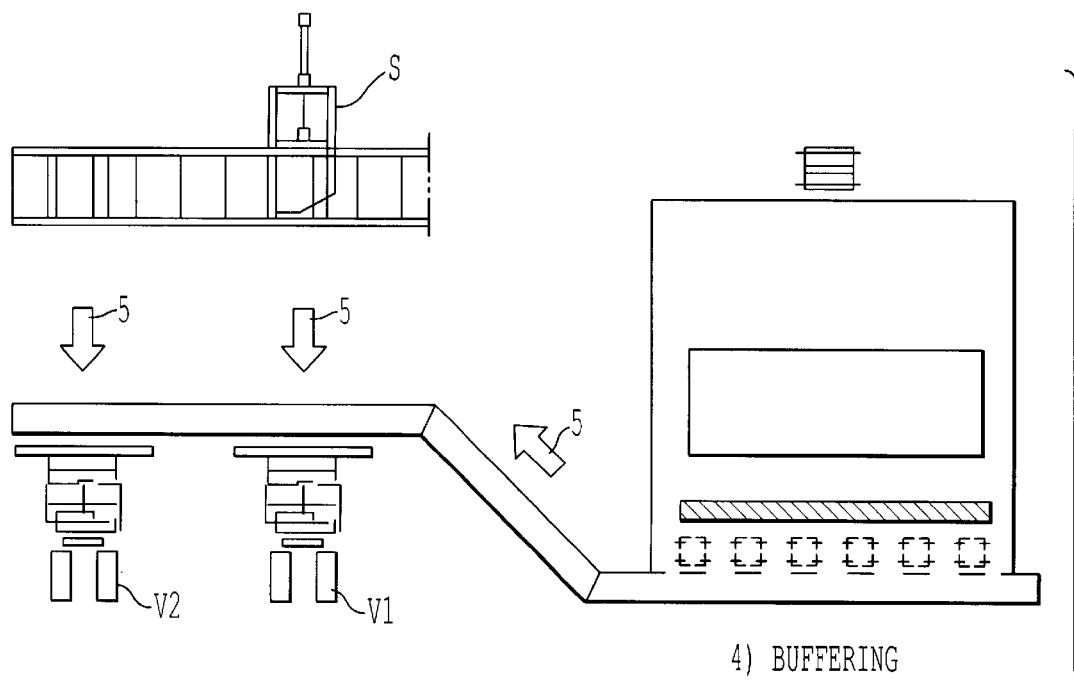
Figure 1B:
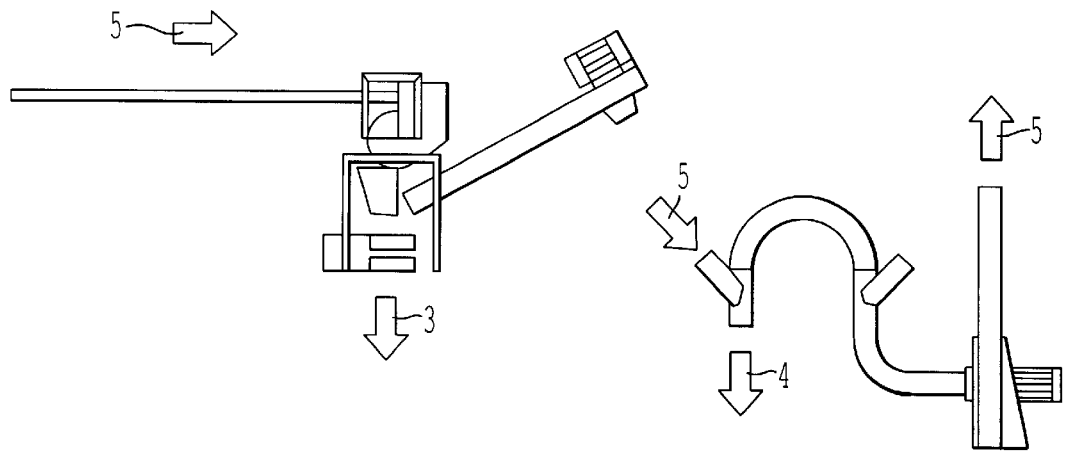

The shredded material, changing over to the illustration in FIG. 1B, is then conveyed to a buffer silo (station 4.)) by means of a scraper chain conveyor or the like. Practice has shown that scraper chain conveyors best withstand the rough conditions that prevail in the processing plant. The particularly susceptible bottom plates are made right from the start as wearing parts and can, therefore, be replaced. As an alternative conveyor belts could be used; depending on the choice, these two types of conveyors can be used on the mechanically operated conveying sections.

The buffer silo of station 4.)—the same as later the buffer silo of station 8.)—serve as stock-holding stations.

Figure 2:
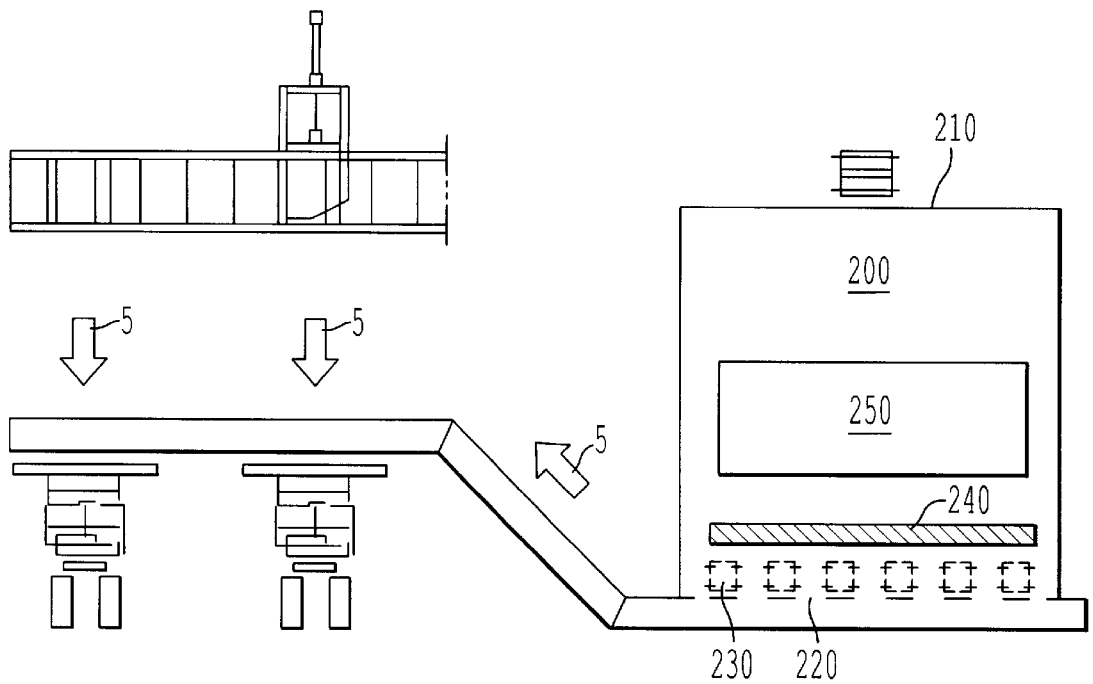
FIG. 2 is a longitudinal sectional view of a buffer silo connected to one or several waste shredders.

If several waste shredders being connected in parallel are provided in the plant, they all work via associated conveying sections into a buffer silo. It is also possible to connect the waste shredders in series, in which case only one conveying apparatus would be required. The filling level of the buffer silo is monitored manually. When a maximum filling level is exceeded, the operator switches off one or more of the machines that feed the buffer silo. When the minimum filling level is reached, he switches the machine on again. The monitoring of the filling level can also take place automatically, e.g. by light barriers or vane-type indicators, in which case when a first predetermined filling level is exceeded one or several machines are switched off automatically and after the filling level drops below a second predetermined level they are switched on again. Structural details of the buffer silos are illustrated in FIG. 2 and will be described further on.

A scraper chain conveyor that moves the material away is fed evenly with material from the buffer silo and operates at a constant speed of, for example, 0.25 m/s. This conveyor has two openings, one of which has a cross-section that is variable by means of a pneumatic slide valve S. From this conveyor the material is evenly distributed onto two vibration chutes V1, V2, which in turn move the material on at a slightly faster speed than the scraper chain conveyor, i.e. at 0.33 m/s. The in the running direction first vibration chute V1 is opened when required, e.g. when two following plant sections need to be charged. Three positions of the slide valve S are possible, depending on whether only one of the plant sections needs to be charged or both plant sections need to be charged evenly. Above the in the running direction second vibration chute V2 the scraper chain conveyor has only one opening.

The vibration chutes V1, V2 convey the entire material by means of magnetic drums (station 5.)), wherein corresponding to the number of vibration chutes two magnetic drums are provided here. On the vibration chutes, due to gravity and the shaking movement inside the fraction, the metal particles sink down. This permits an almost complete separation of the heavy metal particles from the lighter plastic material. It would be optimal if the metal particles were put onto the magnetic drums in one layer. This will be difficult to achieve in practice.

The magnet inside the magnetic drum has an operating radius of 180°. The 5 mixed plastic drops into a hopper at an angle of 90° to 180°. The magnetic metal particles stick to the drum, are taken out of the center of the magnetic field forces by the rotation of the drum and drop into a second hopper installed behind. The metal is moved away by a scraper chain conveyor and collected in a container. It was found that the use of drums is superior to the normally used top-belt magnets as with the latter the adhering metal parts clamp in film parts. This increases in an undesirable manner the discharge of plastic material via the magnetic belts. Similarly, small metal particles are not separated.

The further conveying of the fraction is ensured by conveyor screws that move the material on at a material conveying speed of, for example, 0.51 m/s. They loosen up the material for the subsequent gravity pipe sifter (station 6.)) in which the separation of heavy non-magnetic particles takes place using a vacuum and the material flow is accelerated to 5 to 25 m/s. Structural details of the gravity pipe sifter are presented in FIG. 4 or 5.

The heavier waste substances and adhesions drop, not illustrated here, onto scraper chain conveyors which collect the separated material and move it into containers. The utilizable mixed plastic material remains behind and is conveyed pneumatically to the paper separation by means of blowers. The air flow has a speed of, for example, 25 m/s.

In connection with the buffer silo of station 4.), which forms a stock-holding station in terms of the invention, it is apparent that the speed of the mixed waste flow between two adjoining stations is essentially constant, but that the mixed waste is conveyed to the in each instance next station at a speed which is greater than the speed at which it was conveyed to the preceding station, so that the particles of the mixed waste flow are, therefore, accelerated at the point of transfer on the transport path to the next station. Also, conveying elements provided in between, such as the vibration elements, can operate at a speed which has been chosen according to the incremental process. The basic principle is to even out the material flow and to speed it up so as to ensure the most optimal possible separation of waste substances. This is achieved in that the density of the material flow is reduced by the aforementioned acceleration of the particles.

It must be pointed out here that the loosening-up screws used in some stations also ensure an evening out of the material flow. The mixed waste material contains moisture and dirt, so that the shredded particles will tend to stick together. The particles furthermore tend to cause jamming, for example due to sharp edges on metal particles. Both the sticking together as well as the jamming are loosened up by the loosening-up screws.

Figure 1C:
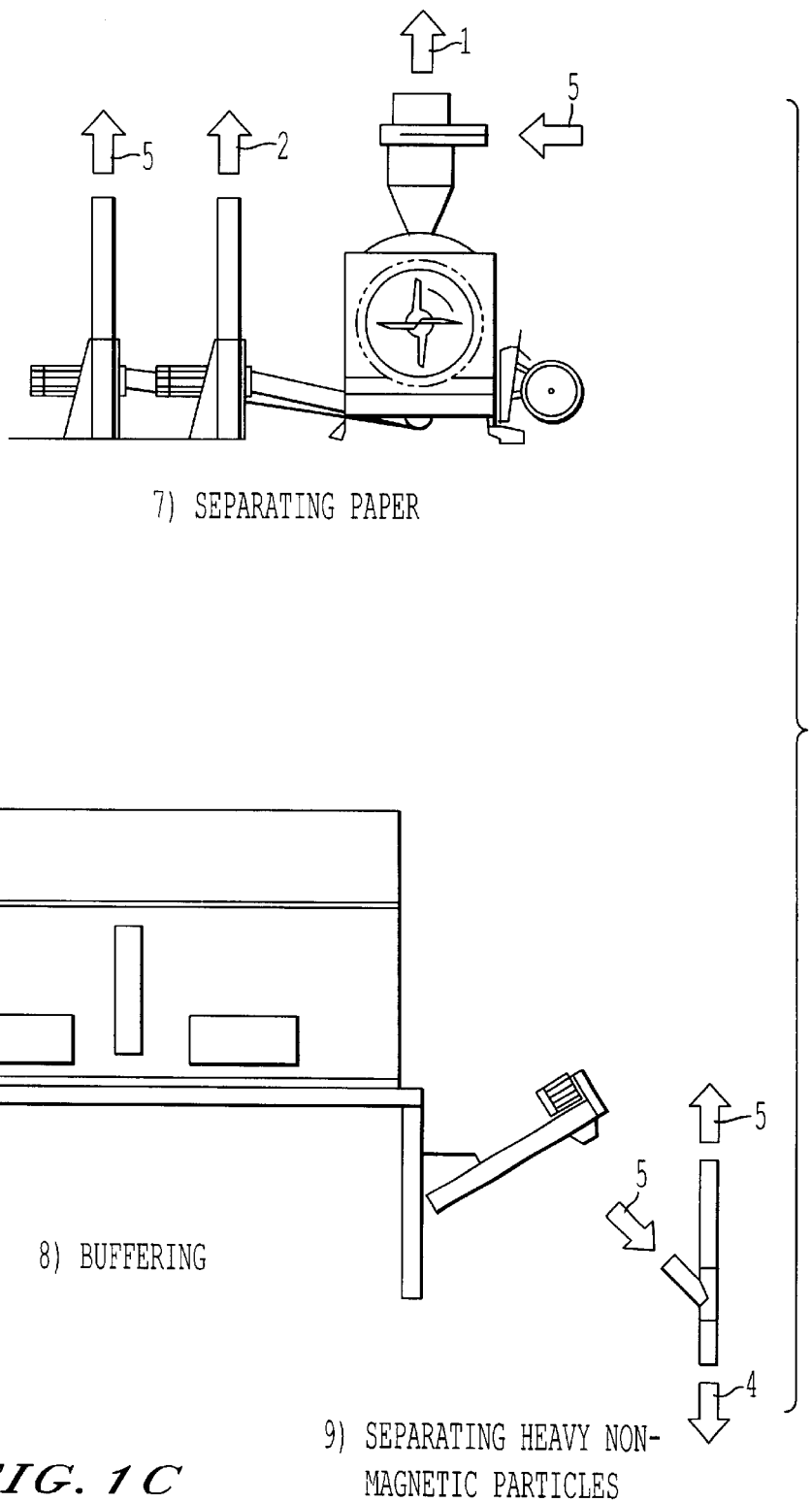

In connection with FIG. 1C the separating of paper is illustrated diagrammatically (station 7.)). Particularly in this process step the adhering paper portion must be removed from the mixed plastic material. For this purpose, paper mills are provided into which the material falls by way of cyclone separators. Inside the housing of the paper mill a rotor flings the fraction outwards against a screen basket by means of centrifugal force. Using specially shaped paper separators, as described for example DE 196 16 623 A1, a high friction is produced in addition. As a result the paper is torn up into very small particles, passes outwards through the screen basket and in this way is drawn off by a paper suction fan and moved into a container via a compacting screw. The much tougher plastic material remains behind in the screen basket and using a suitable paddle position of the rotor and the vacuum of a material suction fan is conveyed to another buffer silo (station 8.)), which is described in connection with FIG. 3. The heat produced by the friction ensures an additional drying of the fraction. Both fractions, plastic and paper, are separated from the conveying air by cyclone separators. The process air is cleaned by an active carbon filtering unit (such as station 17.)) and guided outwards. A fan produces a vacuum in the buffer silo using a suction hood so as to avoid dust formation. Subsequently, a further separating of heavy, non-magnetic particles takes place inside a gravity pipe sifter (station 9.)), which is described in connection with FIG. 4 or 5. The suction capacity in the gravity pipe sifter is adjusted in such a way that heavy particles fall to the bottom. The lighter fraction is carried away by the air flow and conveyed to the next process step. After passing the second gravity pipe sifter, the plastics fraction has an average ash content, i.e. a content of inert substances (glowing residue) of less than 4.5%.

Figure 1D:
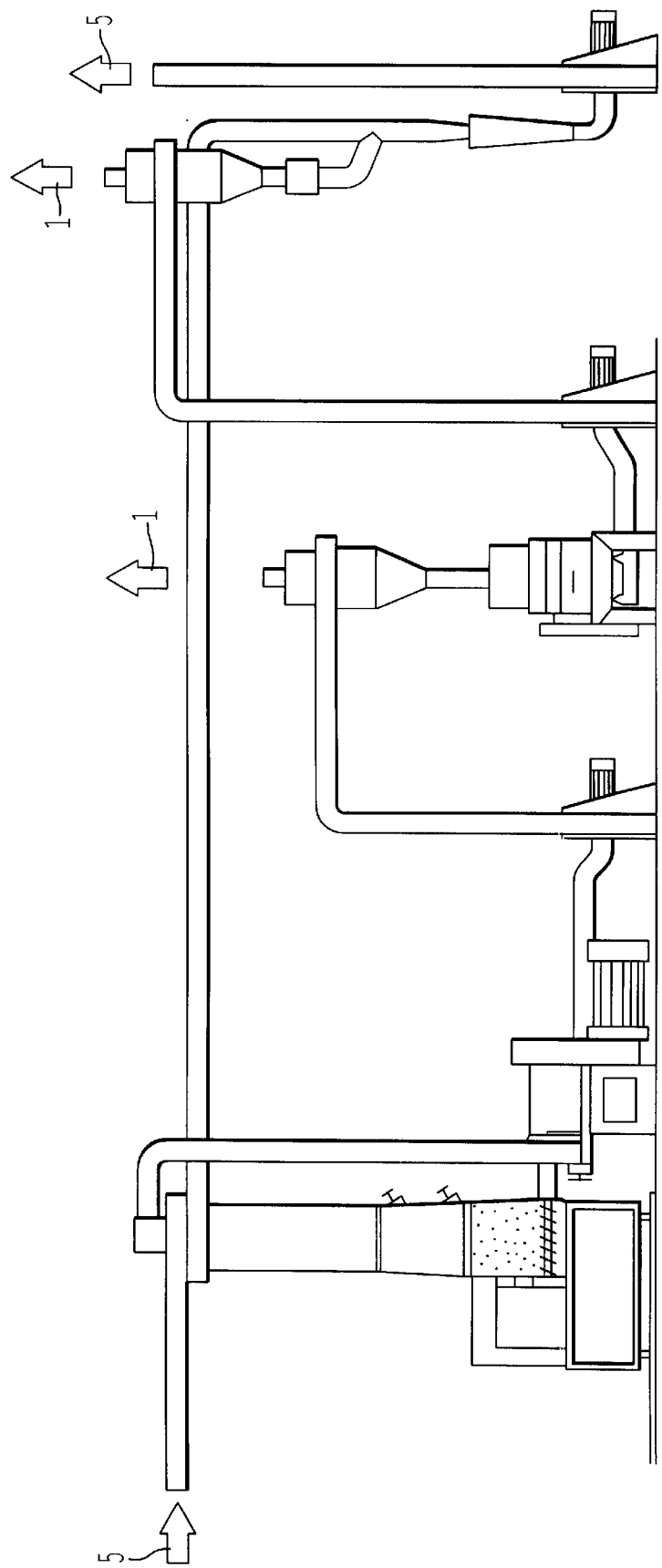

The compressing of the mixed plastic material takes place, as illustrated diagrammatically in FIG. 1D, in one or several parallel connected agglomerators or compactors of the known type (station 10.)). Subsequently a comminuting to a predetermined particle size of, for example, 1.0 cm takes place (station 11.)). The mixed plastic material is also pneumatically supplied to the agglomerators. Here the optimal filling level is regulated by two vibration limit switches or light barriers. Stirring mechanism shafts in the feed hopper of an agglomerator ensure a continuous feeding of the intake screw. In the agglomerator the mixed plastic is processed into a free-flowing material with a specific weight of more than 300 g/l. Details of the agglomerator are described in connection with FIG. 5.

After this process step a blower moves the compacted material on to the post-comminuting (station 11.)). Post-cutting mills have a spray system to ensure a cooling of the mill by spraying in a water/air mixture, so as to avoid too much of a plasticising of the material. This prevents blockages from occurring due to too great a heating of the material. Between the station 10.) and the station 11.) the conveying is ensured by the already mentioned (central) blower. It may be advantageous when in addition a water/air mixture in the form of a mist is sprayed into the line between the station 10.) and the station 11.) so as to plasticise the surface of the material coming from the compactor and prevent the sticking together. However, the actual cooling down process takes place in station 11.), where because of the high speeds in the mill a fast sequence of quenching-cutting-quenching . . . up to the final particle size of the material takes place. In doing so the moisture content is regulated in such a way that no residual water is present in the agglomerate. This means approximately 20 to 40 liters of water per 500 kg of plastic material.

Figure 1E:
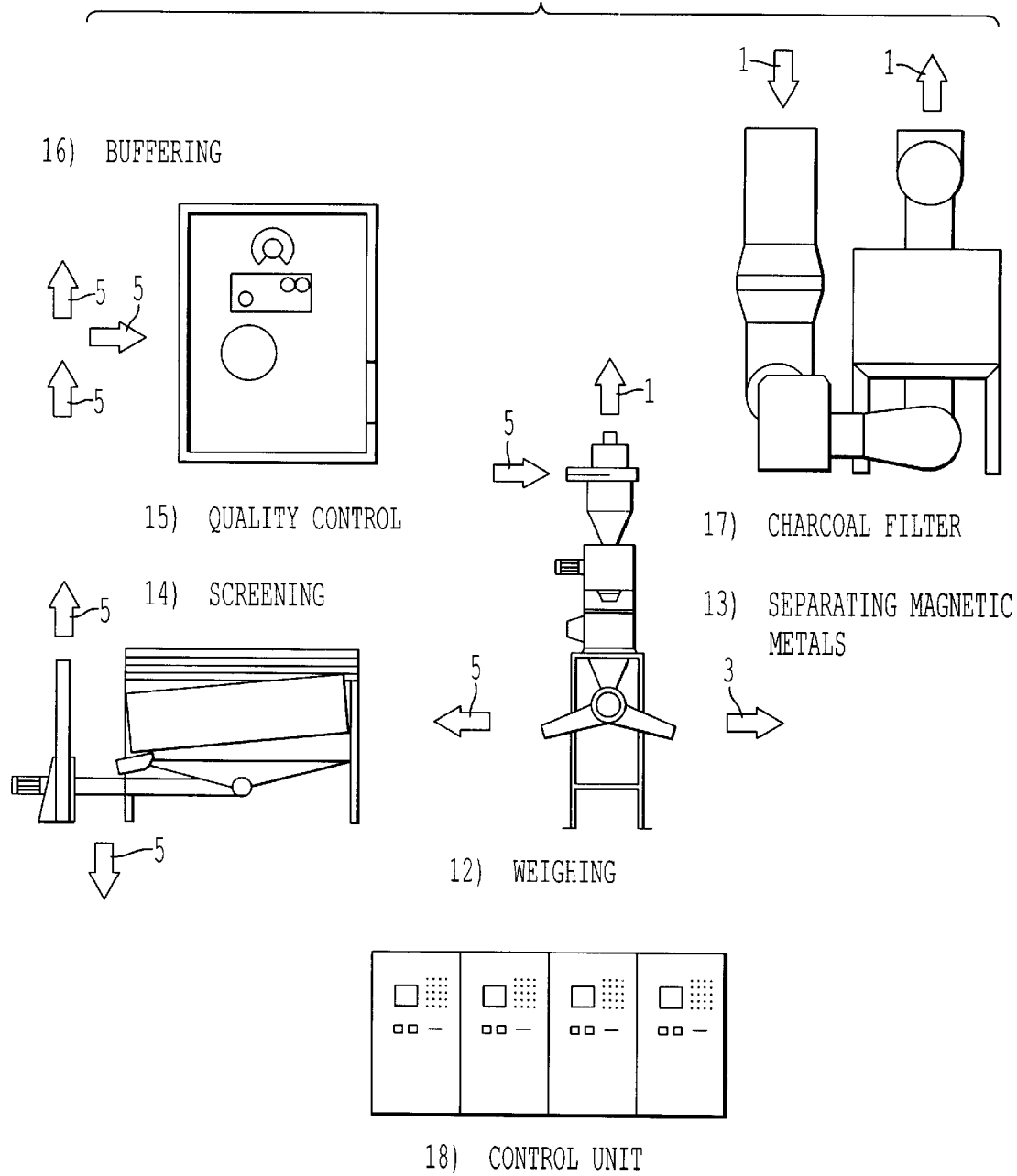

As illustrated in FIG. 1E, the weighing (station 12.)) of the processed agglomerate takes place subsequently, whereby an impact scale is used, which is known as such and has proved advantageous in connection with the pneumatic conveying of the material. Subsequently, another separation of magnetic metals takes place (station 13.)). The agglomerate then passes through a rotating, inclined screening drum (station 14.)), wherein all particles that have a diameter of smaller than 10 mm fall through the screen. A blower conveys the agglomerate occurring in the hopper to the finished product silos. Particles that do not fall through the screen are moved out by the screening drum in the inclined direction. This material is returned to the buffer silo (station 8.)) which is provided ahead of the compacting. A quality control (station 15.)) ensures that the guidelines in respect of the product specification for agglomerates for the raw material utilization are adhered to. In the buffer silo units (station 16.)) dust filters and vibrating devices are provided, the material discharge takes place via a horizontal screw into silo vehicles. A suitable plant control unit (station 18.)) ensures the drive and monitoring of the plant components and, if needed, in the event of critical limit values switches off the plant ahead of the station where the problem occurs.

The process is carried out with a continuous process air flow, wherein the process air is only blown off after it has been cleaned (station 17.)).

FIG. 2 shows a buffer silo in which the material of all shredders is collected. The storage capacity of such a buffer silo is, for example, 40 m$^3$. The buffer silo consists of a housing 200, into which the shredded mixed waste is conveyed using scraper chain conveyors, illustrated diagrammatically in the drawing above opening 210, through opening 210. The shredded material then falls into the bottom part of the housing 200 where six parallel mounted discharge screws 230 are installed. They cover the entire bottom area of the housing 200 and operate in such a way that a bridge formation of the shredded material is prevented. If required, the housing 200, can therefore also be emptied completely. Provided offset by 90° opposite the discharge screws 230 is a fore-runner screw 240, which ensures a uniform charging of the scraper chain conveyor that moves the material away. The rotational speed of the fore-runner screw 240 is slightly slower than the rotational speed of the discharge screws 230, related to the conveyed quantities; for example, the rotational speed of the fore-runner screw 240 is 16 l/min, whereas the speed of a discharge screw 230 is 21 l/min.

Figure 3:
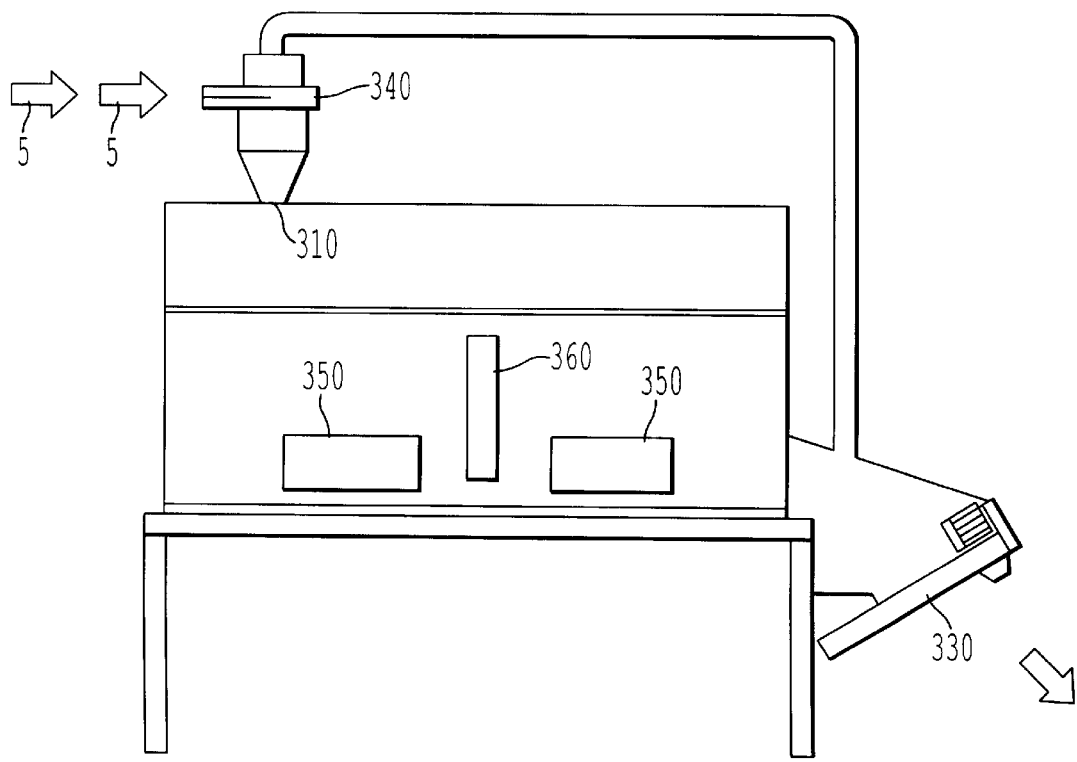
FIG. 3 is a longitudinal sectional view of a buffer silo connected to the paper separator.

In FIG. 3 a buffer silo is illustrated, in which the plastic material fraction is collected. This silo also consists of a housing 300 which, however, in order to avoid bridge formations, is widened conically or trapezoidal towards the bottom—not illustrated in the drawing. The filling is monitored by a filling level control with vibration indicators behind the inspection window 360. In addition, two inspection windows 350 permit an optical checking of the filling level. The material of the plastics fraction is fed into the housing 300 through an opening 310. A fan 340 produces a vacuum in the housing 300, so that dust formation is avoided. The drawn off air enriched with plastic particles is fed to loosening-up screws 330, which are also under vacuum. Furthermore provided in the housing 300 are discharge screws (not illustrated) which convey the plastic material to the loosening-up screws 330.

Figure 4:
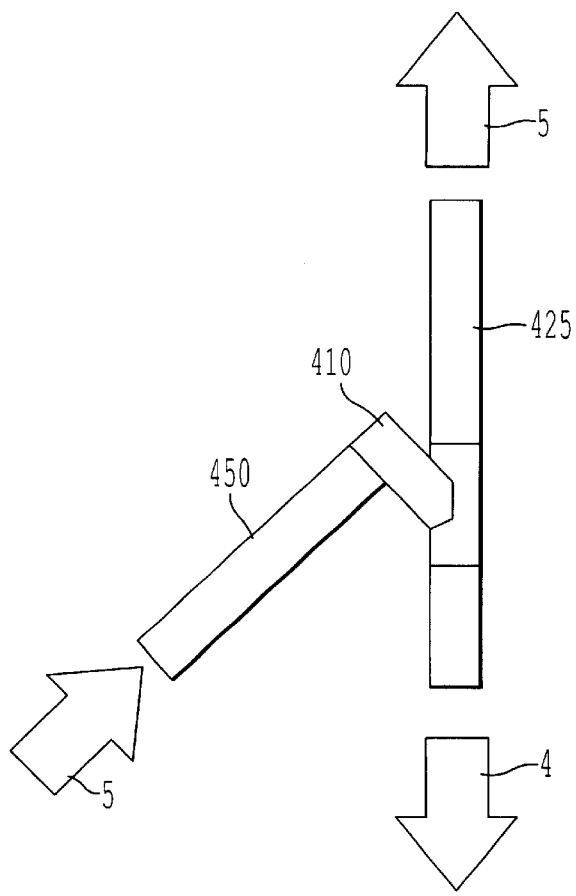
FIG. 4 is a longitudinal sectional view of a gravity pipe sifter of the station 6.)

FIG. 4 shows a longitudinal sectional view of a simple gravity pipe sifter according to the invention. Here a mass flow 5 is fluidized and split up in a screw conveyor 450 with screw spiral 451 and the mass flow 5 prepared in this manner is fed to the separation pipe 425 through a feed connection 410, the longitudinal axis of which forms an angle of approximately 45° with the longitudinal axis of the separating pipe 425, which extends vertically. The angle can also have a different values so as to vary the inlet speed of the material mixture into the air flow. The air flow in the separating pipe 425 is directed vertically upwards and is produced by a fan (not illustrated).

On entering the separating pipe 425 the material mixture hits the air flow, wherein an upwards directed force acts on the individual and fluidized particles of the material mixture. The particles which have a specific weight below a predetermined value are acted upon by the forces exerted by the air flow at an upwards directed speed. These light particles are moved on in form of the mass flow 5 for further processing.

The heavy particles, because of the greater gravitational forces, cannot be acted upon by the forces exerted by the air flow at an upwards directed speed, they reach a downwards directed speed and are discharged as the mass flow 4.

A gravity pipe sifter that achieves this, is provided, for example, in the station 6.).

Figure 5:
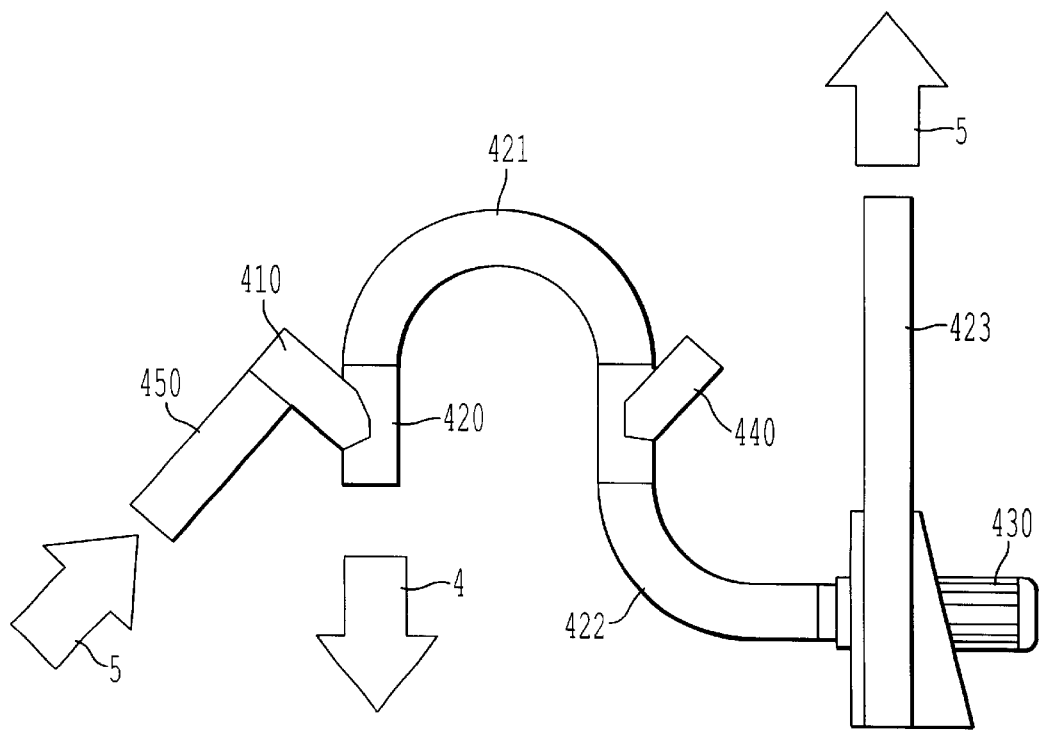
FIG. 5 is a longitudinal sectional view of a gravity pipe sifter of the station 9.)

FIG. 5 shows a longitudinal sectional view of a specially preferred gravity pipe sifter which is provided, for example, in the station 9. Here a mass flow of a material mixture 5 is also first fluidized and split up in a screw conveyor 450 with screw spiral 451 and is then fed through a feed pipe 410 into a separating pipe 420. Analogously to the gravity pipe sifter illustrated in FIG. 4, the heavy particles are discharged with a mass flow 4. The light particles are accelerated vertically upwards and are moved on along conveying pipes 421, 422, and 423 as mass flow 5 for further processing.

A fan 430 produces a vertically upwards directed air flow in pipe 423. As a result thereof a vacuum is generated which produces an air flow in the direction described above in pipes 422, 421, and 420.

Furthermore, variable opening flaps 440 are provided so as to regulate the speed of the air flow during the separation. When the flaps 440 are open outside air is sucked in, as a result of which the speed of the air flow during the separation is reduced. Because of the suction effect no particles can escape through the opening flaps and cause a loss of material.

In both embodiments the screw conveyors 450 are sealed off from the outside air, so that as a result of the suction effect no outside air enters the separation system in an uncontrolled manner. Moreover, the distances between the screw spirals 451 and the housing are kept small.

At this point attention must be drawn to the fact that in addition to the gravity pipe sifters illustrated in FIGS. 4 and 5, also other geometrical arrangements are possible and furthermore, the places of use of the gravity pipe sifters according to the invention can be chosen at will, in particular, for example, the gravity pipe sifter illustrated in FIG. 5 can also be used in the station 9 of the process described above. The gravity pipe sifters according to the invention have been described to elucidate their preferred applications within a recycling process of mixed waste, but they can also be used for other applications where a separation of individual elements according to their specific weight is to be performed.

Furthermore, it must be pointed out that because of the great efficiency of the gravity pipe sifters according to the invention, it is also possible that the process step (d) described above, namely the separating of magnetic metal particles, which is normally performed by magnetic separators, can be omitted when no additional separation of magnetic metals is desired, or the process step (d), in contrast to the sequence described above, can also be provided after the gravity pipe sifters, whereby due to the already performed pre-separation of the process step (d), the separation of magnetic metal particles from the mass flow 4 is more efficient than from the mass flow 5.

Figure 6:
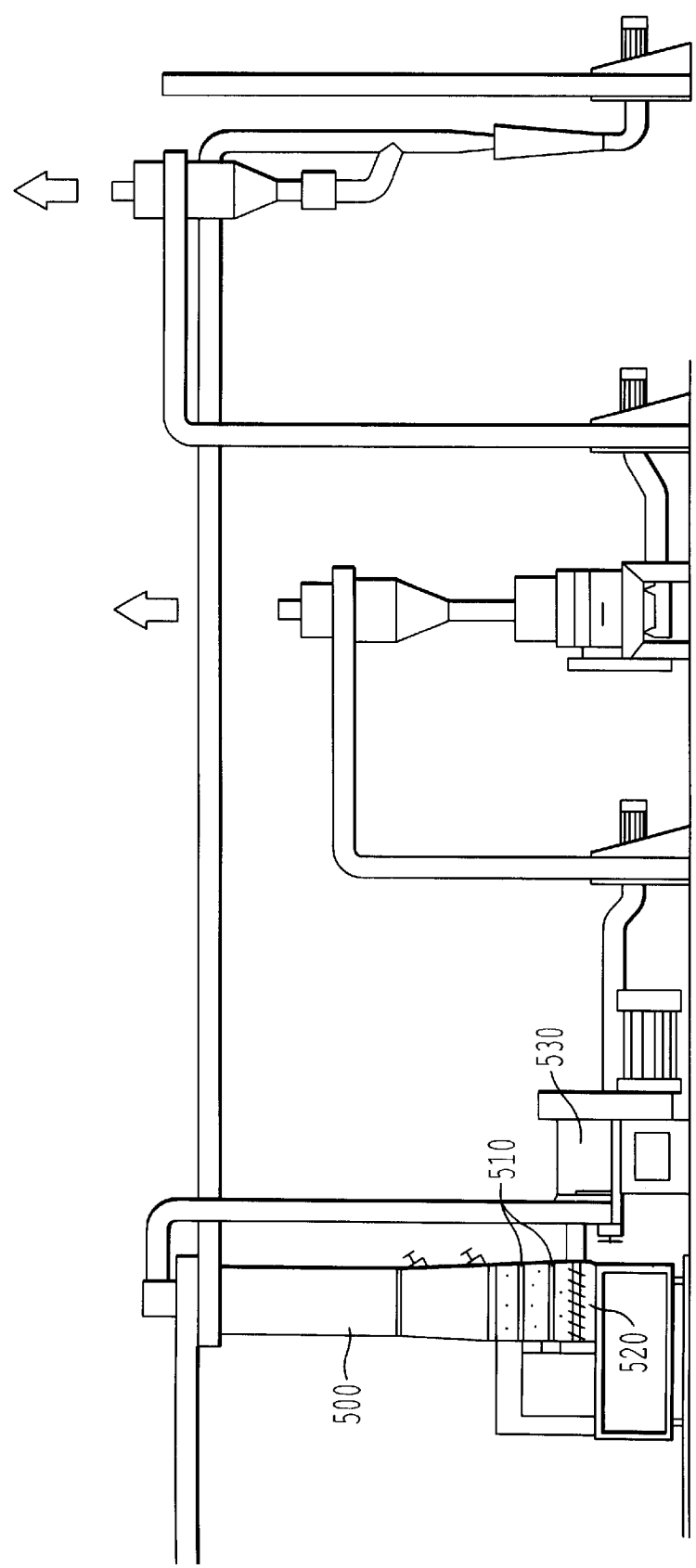

FIG. 6 shows a longitudinal sectional view of an agglomerator. With an actually constructed plant six agglomerators are, for example, connected in parallel. From the buffer silo of FIG. 3 the mixed plastic material is fed pneumatically to the six agglomerators. Two vibration limit switches regulate the optimal filling level. In the feed hopper 500 stirring mechanism shafts 510 ensure a continuous charging of the intake screw 520. The rotational speed of the intake screw 520 can be variably adjusted, for example in the range between 16.8 l/min to 100 l/min. The material fed in by the intake screw 520 is processed in the known manner between two discs arranged in an agglomerate housing 530, which are provided with exchangeable kneading bars. One of the discs is constructed as a stator disc and the other as a rotor disc. By means of a bearing bushing that can be shifted axially in the agglomerator housing 530, the distance between the stator disc and rotor disc can be adjusted. To avoid a thermal over-stressing of the material, the two discs are provided with a cooling system. In doing so bores extend radially into the center of the discs so that water can be supplied in a controlled manner to cool the discs, so that the temperature will not get into a range in which the plastic will plasticise too much and the discs would become sticky. The cooling water temperature should not exceed 40° C.

What is claimed is:

1. A process for processing mixed waste for the operation of a continuously operating dry-mechanical processing plant which includes a plurality of successive processing stations each connected by at least one conveying section, the process at least comprising the steps of:

separating metal at a metal separation processing station being one of the plurality of successive processing stations;

air or wind sifting at an air or wind sifting processing station being another one of the plurality of successive processing stations;

removing paper at a paper removal processing station being another one of the plurality of successive processing stations, wherein the steps of the separating of the metal, the air or wind sifting, and the removing of the paper are performed in a sequential order as listed either each step being directly after the other or having further steps provided; and accelerating a good-material flow on the conveying section between the metal separation processing station and the air or wind sifting processing station and on the conveying section between the air or wind sifting processing station and the paper removal processing station, so that an average actual speed of particles of the good-material flow on the conveying section leading to the metal separation processing station is slower than an average actual speed of the particles of the good-material flow on the conveying section between the metal separation processing station and the air or wind sifting processing station, and an average actual speed of the particles of the good-material flow on the conveying section between the metal separation processing station and the air or wind sifting processing station is slower than an average actual speed of the particles of the good-material flow on the conveying section between the air or wind sifting processing station and the paper removal processing station.

2. The process according to claim 1, wherein a flow of the mixed waste between two adjoining ones of the successive processing stations is conveyed on a respective one of the at least one conveying section at a substantially constant speed.

3. The process according to claim 1, wherein in at least one of the successive processing stations a stock of pretreated material is temporarily stored.

4. The process according to claim 1, wherein the mixed waste consists mainly of plastic materials, paper/plastic composite materials, glass, metals, paper, cardboard and other waste substances, for the continuous operation of a processing plant and further comprising the steps of:
- comminuting the mixed waste to produce a comminuted mixed waste;
- immediately storing the comminuted mixed waste to produce an immediately stored mixed waste;
- uniform conveying of the intermediately stored mixed waste;
- separating magnetic metal particles at the metal separation processing station;
- separating non-magnetic particles from materials with a specific weight which exceeds a predetermined minimum specific weight at the air or wind sifting processing station;
- separating paper from paper/plastic composite materials to obtain a plastic material fraction at the paper removal processing station;
- immediately storing the plastic material fraction; and
- agglomerating the plastic material fraction to obtain agglomerated plastic material.

5. The process according to claim 4, wherein after immediately storing the plastic material fraction, the separating of the non-magnetic particles from the materials with the specific weight which exceeds the predetermined minimum specific weight is carried out again.

6. The process according to claim 4, further comprising comminuting the agglomerated plastic material to a fixed particle size.

7. The process according to claim 6, wherein after comminuting the agglomerated plastic material to a fixed particle size, the separating of the magnetic metal particles is carried out again.

8. The process according to claim 4, wherein the material of the mixed waste to be processed is conveyed pneumatically.

9. A processing plant for performing a process for processing mixed waste for the operation of a continuously operating dry-mechanical processing plant which includes a plurality of successive processing stations each connected by at least one conveying section, the process at least comprising the steps of separating metal at a metal separation processing station being one of the plurality of successive processing stations, air or wind sifting at an air or wind sifting processing station being another one of the plurality of successive processing stations, removing paper at a paper removal processing station being another one of the plurality of successive processing stations, wherein the steps of the separating of the metal, the air or wind sifting, and the removing of the paper are performed in a sequential order as listed either each step being directly after the other or having further steps provided, and accelerating a good-material flow on the conveying section between the metal separation processing station and the air or wind sifting processing station and on the conveying section between the air or wind sifting processing station and the paper removal processing station, so that an average actual speed of particles of the good-material flow on the conveying section leading to the metal separation processing station is slower than an average actual speed of the particles of the good-material flow on the conveying section between the metal separation processing station and the air or wind sifting processing station, and an average actual speed of the particles of the good-material flow on the conveying section between the metal separation processing station and the air or wind sifting processing station is slower than an average actual speed of the particles of the good-material flow on the conveying section between the air or wind sifting processing station and the paper removal processing station, wherein the mixed waste consists mainly of plastic materials, paper/plastic composite materials, glass, metals, paper, cardboard and other waste substances, for the continuous operation of a processing plant and further comprising the steps of comminuting the mixed waste to produce a comminuted mixed waste, immediately storing the comminuted mixed waste to produce an immediately stored mixed waste, uniform conveying of the intermediately stored mixed waste, separating magnetic metal particles at the metal separation processing station, separating non-magnetic particles from materials with a specific weight which exceeds a predetermined minimum specific weight at the air or wind sifting processing station, separating paper from paper/plastic composite materials to obtain a plastic material fraction at the paper removal processing station, immediately storing the plastic material fraction, and agglomerating the plastic material fraction to obtain agglomerated plastic material, the processing plant comprising:
- at least one shredder for comminuting the mixed waste to produce shredded mixed waste;
- a first buffer silo serving as a first stock-holding station into which the shredded mixed waste is conveyed from each of the shredders, wherein the first buffer silo includes a device for uniform charging of a conveyor that moves the shredded mixed waste away;
- at least one magnetic separator located at the metal separation processing station;
- at least one device for separating non-magnetic particles from materials with a specific weight which exceeds a predetermined minimum specific weight located at the air or wind sifting processing station;
- at least one device for separating paper from paper/plastic composite materials to form a plastic material fraction located at the paper removal processing station;
- a second buffer silo serving as a second stock-holding station in which the plastic material fraction from each of the devices for the separating of the paper is collected; and
- at least one agglomerator for agglomerating the plastic material fraction to from an agglomerate.

10. The processing plant according to claim 9, wherein the second buffer silo in which the plastic material fraction is collected, is followed by at least one further device for separating non-magnetic particles from materials with a specific weight which exceeds a predetermined minimum specific weight.

11. The processing plant according to claim 9, wherein the at least one agglomerator is followed by a device for comminuting the agglomerate to a fixed particle size to form a comminuted agglomerate.

12. The processing plant according to claim 11, wherein at least one further magnetic separator is provided to which the comminuted agglomerate is conveyed.

13. The processing plant according to claim 9, wherein the first buffer silo has a housing with at least one opening in an upper part of the housing for feeding in material for intermediate storage and at least one discharge opening for the material, and further comprising a plurality of discharge screws provided in a bottom part of the housing, wherein the discharge screws are arranged in such a way that an action thereof covers an entire bottom area of the housing and at least one fore-runner screw is provided which conveys the material in a homogenizing manner over at least a part of the discharge screws, so that an evened-out mass flow of the material is discharged through the at least one discharge opening.

14. The processing plant according to claim 13, wherein the discharge screws of the first buffer silo each operate with a different direction of rotation.

15. The processing plant according to claim 13, wherein the discharge screws of the first buffer silo are arranged parallel to one another and the forerunner screw is arranged opposite the discharge screws offset by 90°.

16. The processing plant according to claim 9, wherein the second buffer silo has a housing with at least one opening in an upper part of the housing for feeding in material for intermediate storage and with at least one discharge opening for the material, and further comprising at least one loosening-up screw placed under vacuum provided for the material stored in the second buffer silo and a suction device which supplies air from the housing to the at least one loosening-up screw.

17. The processing plant according to claim 16, wherein the housing of the second buffer silo is widened, in either a conical shape or a trapezoidal shape, toward a bottom part.

* * * * *